United States Patent
Hara

(10) Patent No.: US 11,260,578 B2
(45) Date of Patent: Mar. 1, 2022

(54) THREE-DIMENSIONAL PRINTING MACHINE AND THREE-DIMENSIONAL PRINTING METHOD

(71) Applicant: MIMAKI ENGINEERING CO., LTD., Nagano (JP)

(72) Inventor: Hirofumi Hara, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 1369 days.

(21) Appl. No.: 14/819,407

(22) Filed: Aug. 5, 2015

(65) Prior Publication Data
US 2016/0039152 A1    Feb. 11, 2016

(30) Foreign Application Priority Data

Aug. 8, 2014  (JP) .............................. JP2014-163151
May 12, 2015  (JP) .............................. JP2015-097756

(51) Int. Cl.
*B29C 64/40* (2017.01)
*B29C 64/112* (2017.01)
*B33Y 10/00* (2015.01)
*B33Y 30/00* (2015.01)

(52) U.S. Cl.
CPC ............ *B29C 64/112* (2017.08); *B29C 64/40* (2017.08); *B33Y 10/00* (2014.12); *B33Y 30/00* (2014.12)

(58) Field of Classification Search
CPC ...................................................... B29C 64/40
See application file for complete search history.

(56) References Cited

FOREIGN PATENT DOCUMENTS

| EP | 2447046 A2 * | 5/2012 | ............. B29C 64/40 |
|---|---|---|---|
| JP | 2010-155889 | 7/2010 | |
| JP | 2012096428 | 5/2012 | |

OTHER PUBLICATIONS

Kruth, J.P. "Material Incress Manufacturing by Rapid Prototyping Techniques," CIRP (College International pour la Recherche en Productique/The International Academy for Production Engineering) Annals-Manufacturing Technology, vol. 40, No. 2, 1991, pp. 603-614. <DOI:10.1016/S0007-8506(07)61136-6>.*

"Office Action of Japan Counterpart Application," dated Nov. 20, 2018, with English translation thereof, p. 1-p. 5.

* cited by examiner

*Primary Examiner* — Matthew J Daniels
(74) *Attorney, Agent, or Firm* — JCIPRNET

(57) ABSTRACT

This disclosure forms a cubic body that can easily be dismounted from a table. A three-dimensional printing machine (1) has an ink-jet head (4B) for forming each layer of a supporter (S) with a supporting material. The ink-jet head (4B) discharges a first supporting material and a second supporting material, as the supporting material, for forming each layer of the supporter (S); adhesive strengths of the first supporting material and the second supporting material, for adhering to the table (7), being different from each other.

10 Claims, 4 Drawing Sheets

THREE-DIMENSIONAL PRINTING MACHINE AND THREE-DIMENSIONAL PRINTING METHOD

CROSS REFERENCE TO RELATED APPLICATIONS

This application claims the priority benefit of Japanese Patent Application No. 2014-163151, filed on Aug. 8, 2014, and Japanese Patent Application No. 2015-097756, filed on May 12, 2015. The entirety of each of the above-mentioned patent applications is hereby incorporated by reference herein and made a part of this specification.

TECHNICAL FIELD

The present disclosure relates to a three-dimensional printing machine and a three-dimensional printing method for printing a shaped object having a three-dimensional form.

DESCRIPTION OF THE BACKGROUND ART

A method, in which a shaped object is formed by laminating a hardened-material hardened by way of light irradiation to a model material to be hardened by being irradiated with light, is known as a method for forming a shaped object having a three-dimensional form. In such a method, if a higher position has a larger part in width (so-called an overhang part) than a lower position has, in the shaped object, a supporter is placed around the lower position in the shaped object so as to support the overhang part from a lower side.

Patent Document 1 discloses a three-dimensional printing machine that uses an acrylamide-base compound including one vinyl group, as a supporting material that makes up a supporter. An acrylamide-base compound including one vinyl group is a (meta-) acrylamide or its N-substitution product; and as the N-substitution product, there are named, for example; an N-methyl (meta-) acrylamide; an N-ethyl (meta-) acrylamide; an N-propyl (meta-) acrylamide; an N-butyl (meta-) acrylamide; An N-alkyl (meta-) acrylamide including an alkyl group with the number of carbons of one through four, such as an N, N'-dimethyl (meta-) acrylamide (also called DMAA), an N, N'-diethyl (meta-) acrylamide, and the like; An N-hydroxy alkyl (meta-) acrylamide including an alkyl group with the number of carbons of two through four, such as an N-hydroxy ethyl (meta-) acrylamide (also called HEAA), an N-hydroxy propyl (meta-) acrylamide, an N-hydroxy butyl (meta-) acrylamide, and the like; and so on.

[Patent Document 1] Japanese Unexamined Patent Application Publication No. 2010-155889 (laid open on Jul. 15, 2010).

SUMMARY

Problem to be Solved

In general, when a shaped object and a supporter (hereinafter, collectively called a cubic body) are formed by laminating a hardened-material of a model material and a supporting material that are hardened, a surface of the model material and the supporting material is mostly smoothed for the purpose of controlling a lamination thickness. In this case, in order to prevent the supporting material from getting peeled off from a table for manufacturing the shaped object, due to a shearing force applied at a time of smoothening the surface of the model material and the supporting material, the supporting material needs to adhere to the table with a great adhesion force. Therefore, a supporting material disclosed in Patent Document 1 has a property of strongly adhering onto a table so as not to move away easily.

Unfortunately, if the supporting material strongly adheres onto the table, it becomes difficult to dismount a finished cubic body from the table so that it takes much time to dismount the cubic body. Moreover, there could be even a risk of breaking the cubic body.

Furthermore, even in the case where a resin plate is placed onto a table for forming a shaped object on the resin plate, it is difficult to dismount a cubic body from the resin plate so that the resin plate may be deformed at a time of dismounting the cubic body, and it may become necessary to cut the resin plate around the cubic body. Therefore, it is needed to change the resin plate every time when a cubic body is formed.

Thus, the present disclosure provides a three-dimensional printing machine and a three-dimensional printing method for forming a cubic body that can easily be dismounted from a table for manufacturing a shaped object.

Solutions to the Problem

To bring a solution for the subject described above, a three-dimensional printing machine according to one aspect of the present disclosure includes: a mount table on which a shaped object and a supporter for supporting the shaped object are installed; an ink-jet head for a model material, in order to discharge the model material onto the mount table for forming each layer of the shaped object; and an ink-jet head for a first supporting material and an ink-jet head for a second supporting material, in order to individually discharge the first supporting material and the second supporting material onto the mount table for forming each layer of the supporter; adhesive strengths, for adhering to the mount table, of the first supporting material and the second supporting material being different from each other.

At least a lowermost layer of the supporter is formed of the first supporting material and the second supporting material by use of the three-dimensional printing machine according to the present disclosure; and therefore, the lowermost layer of the supporter is formed of the first supporting material and the second supporting material. According to the configuration described above, at a time of dismounting the shaped object and the supporter (hereinafter, collectively called a cubic body) out of the mount table after a shaping operation finishes, a stress is likely to concentrate around a border between the first supporting material and the second supporting material. As a result, when an external force is applied, the stress tends to be transmitted so that the cubic body is likely to be dismounted easily out of the mount table.

Moreover, to bring a solution for the subject described above, a three-dimensional printing method according to one aspect of the present disclosure includes: a step of discharging a model material onto a mount table in order to form each layer of a shaped object; and a step of discharging a supporting material onto the mount table in order to form each layer of a supporter for supporting the shaped object; wherein, in the step of forming each layer of the supporter, a first supporting material and a second supporting material are discharged as the supporting material in order to form at least a lowermost layer of the supporter with the first supporting material and the second supporting material, adhesive strengths of the first supporting material and the second supporting material, for adhering to the mount table, being different from each other.

According to the method described above, the lowermost layer of the supporter is formed of the first supporting material and the second supporting material. Therefore, at the time of dismounting the cubic body out of the mount table after the shaping operation finishes, a stress is likely to concentrate around a border between the first supporting material and the second supporting material. As a result, when an external force is applied, the stress tends to be transmitted so that the cubic body is likely to be dismounted easily out of the mount table.

Moreover, in the three-dimensional printing method according to one aspect of the present disclosure, the ink-jet heads for the supporting materials discharge the first supporting material and the second supporting material, according to a discharge pattern in which an area for discharging the first supporting material and another area for discharging the second supporting material independently exist, in order to form at least the lowermost layer of the supporter.

According to the method described above, the lowermost layer of the supporter is formed so as to include a section made of the first supporting material and a section made of the second supporting material. Therefore, the stress at the time of dismounting the cubic body out of the mount table is likely to concentrate around a border between the first supporting material and the second supporting material. As a result, when an external force is applied, the stress tends to be transmitted easily so that the cubic body can easily be dismounted out of the mount table.

Moreover, in the three-dimensional printing method according to one aspect of the present disclosure, the ink-jet heads for the supporting materials form all layers of the supporter or a plurality of layers including the lowermost layer, by way of discharging the first supporting material and the second supporting material, according to the discharge pattern described above.

According to the method described above, a strength of the supporter can be enhanced. As a result, it becomes possible to prevent the shaped object from breakage. Moreover, in the case where the first supporting material is deliquescent, the second supporting material also works as a dam for blocking deliquescence.

Moreover, in the three-dimensional printing method according to one aspect of the present disclosure, an adhesive strength of the second supporting material for adhering to the mount table is lower than an adhesive strength of the first supporting material for adhering to the mount table; and the discharge pattern described above is a discharge pattern in which the second supporting material is so discharged as to be a grid pattern, and the first supporting material is discharged into each space block in the grid pattern of the second supporting material.

According to the method described above, the stress at the time of dismounting the shaped object out of the mount table is transmitted further easily, so that the shaped object can be dismounted further easily out of the mount table.

Moreover, a three-dimensional printing method according to one aspect of the present disclosure includes: a step of discharging a model material onto a mount table in order to form each layer of a shaped object; and a step of discharging a supporting material onto the mount table in order to form each layer of a supporter for supporting the shaped object; wherein, in the step of forming each layer of the supporter, the first supporting material and the second supporting material are discharged as the supporting material, while at least one of the hardness, the stiffness, and the coefficient of elasticity of the first supporting material and the second supporting material, after being applied onto the mount table and hardened there, is different between the first supporting material and the second supporting material, and at least the lowermost layer of the supporter is formed by way of making a layer of a grid pattern with the second supporting material, and filling each space block in the grid pattern of the second supporting material with the first supporting material; while at least one of the hardness, the stiffness, and the coefficient of elasticity of the second supporting material after being hardened is higher than a corresponding property of the first supporting material.

According to the method described above, the stress at the time of dismounting the shaped object out of the mount table is transmitted further easily, so that the shaped object can be dismounted further easily out of the mount table.

Advantageous Effect of the Disclosue

According to the present disclosure, it becomes possible to form a cubic body that can easily be dismounted from a mount table.

DESCRIPTION OF THE EMBODIMENTS

An embodiment according to the present disclosure is explained below in detail.

(Three-Dimensional Printing Machine 1)

Figure 1:
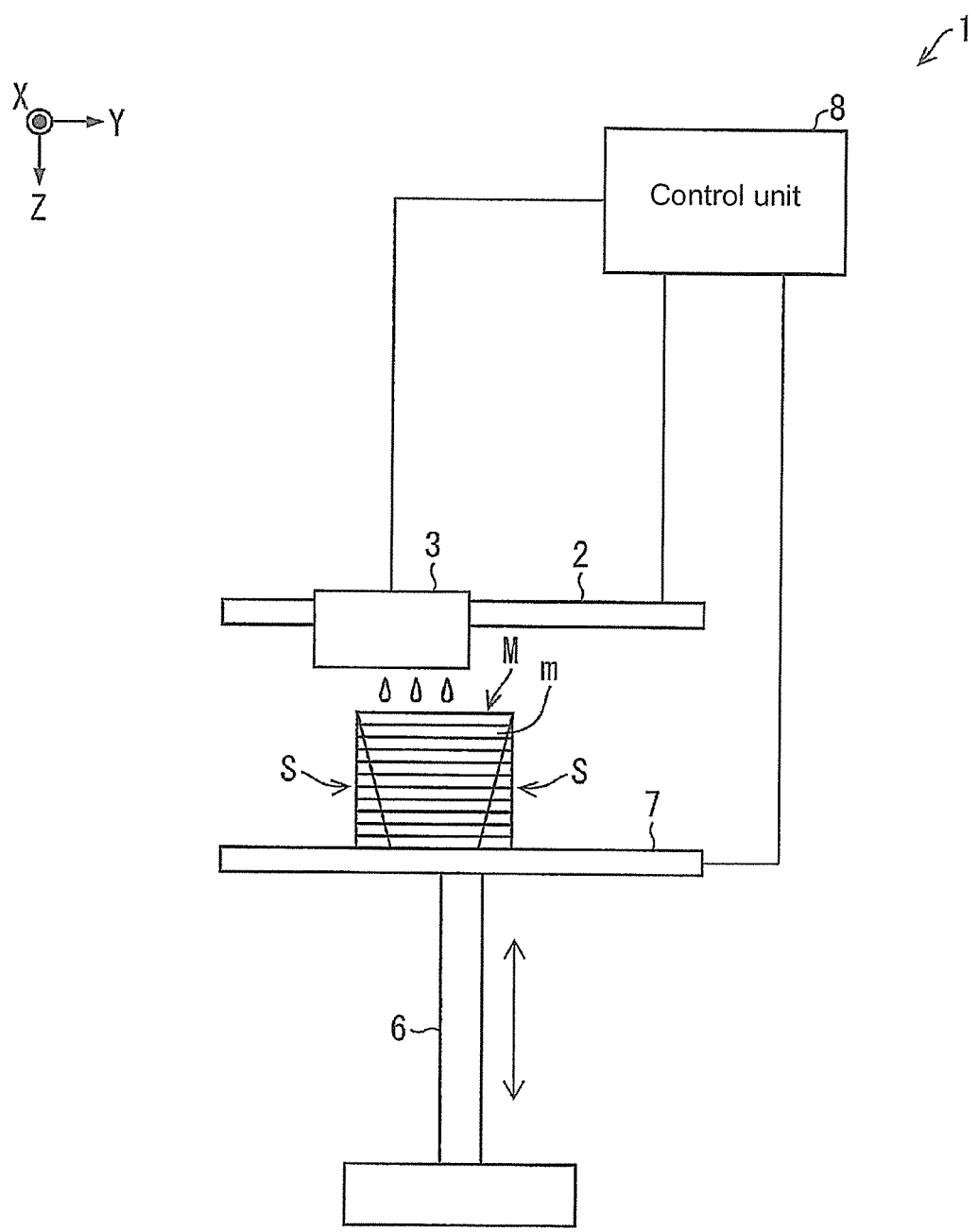
FIG. 1 is a diagram that graphically shows a general configuration of a three-dimensional printing machine according to an embodiment of the present disclosure.
Figure 2:
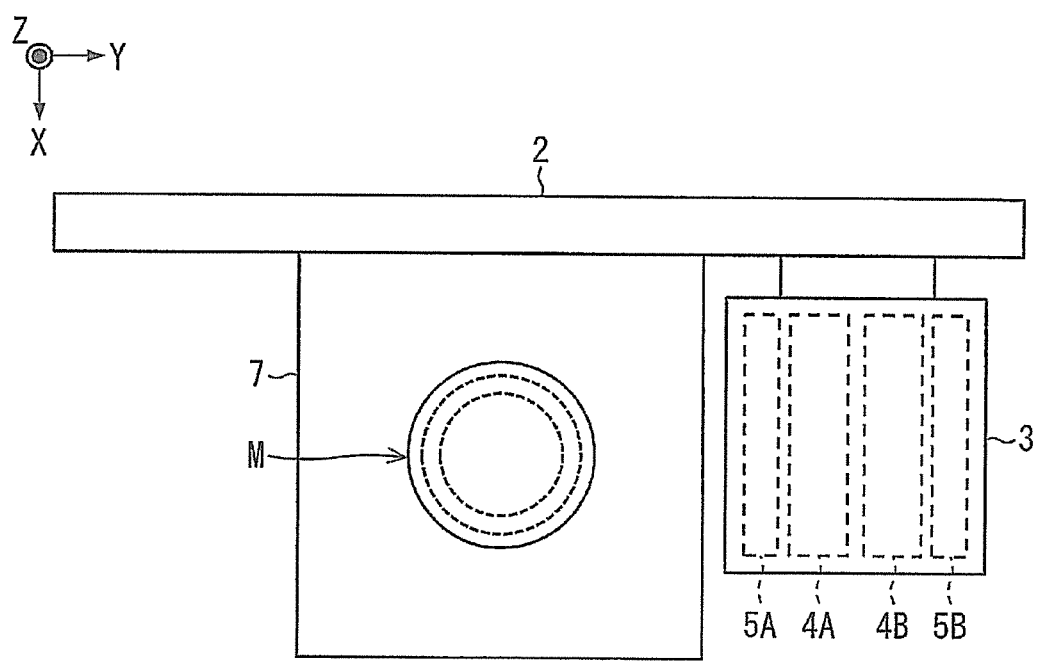
FIG. 2 is a diagram that graphically shows a partial configuration of a three-dimensional printing machine according to an embodiment of the present disclosure.

A three-dimensional printing machine according to an embodiment of the present disclosure is explained below in detail with reference to FIG. 1 and FIG. 2. FIG. 1 is a diagram that graphically shows a general configuration of a three-dimensional printing machine 1 according to an embodiment of the present disclosure. FIG. 2 is a diagram that graphically shows a partial configuration of a three-dimensional printing machine 1 according to an embodiment of the present disclosure.

A three-dimensional printing machine 1 according to the embodiment is a three-dimensional printing machine for forming a shaped object 'M' having a three-dimensional form, by laminating a hardened-material 'm' of a model material and a supporting material that are hardened, on a table 7 (mount table). As shown in FIG. 1, the three-dimensional printing machine 1 includes a Y-direction bar 2, a carriage 3, a Z-direction bar 6, the table 7, and a control unit 8.

<Y-direction Bar 2>

The Y-direction bar 2 stretches in a direction. The direction, in which the Y-direction bar 2 stretches, is a main scanning direction of the three-dimensional printing machine 1, and the direction is a Y-direction in the diagram. In other words, the main scanning direction is a direction in parallel with a surface direction of the table 7. Incidentally, a direction perpendicular to the main scanning direction is a sub-scanning direction, which is represented as an X-direction in the diagram. The Y-direction bar 2 is able to travel in the sub-scanning direction.

<Carriage 3>

As shown in FIG. 2, the carriage 3 includes an ink-jet head 4A, another ink-jet head 4B, an irradiation unit 5A, and another irradiation unit 5B (which are hardening means). The carriage 3 is mounted onto the Y-direction bar 2, so as to reciprocate along the Y-direction bar 2 in the main scanning direction. Accordingly, the carriage 3 produces a movement relative to the table 7; and as a result, the ink-jet heads 4A & 4B, and the irradiation units 5A & 5B, which are described later, produce a movement relative to the table 7. As described above, the Y-direction bar 2 is able to travel in the sub-scanning direction. Thus, the carriage 3 also moves in the same direction as a traveling direction of the Y-direction bar 2, which is namely the sub-scanning direction.

<Ink-Jet Heads 4A & 4B>

The ink-jet head 4A works as an ink-jet head for a model material, which discharges the model material onto the table 7; and meanwhile, the ink-jet head 4B works as an ink-jet head for a supporting material, which discharges the supporting material onto the table 7. The model material is used for forming a shaped object 'M'; and meanwhile, the supporting material is used for forming a supporter 'S' that supports the shaped object 'M' at a time of shaping. In general, if a higher position has a larger part in width (so-called an overhang part) than a lower position has, in the shaped object 'M', a supporter 'S' is placed around the lower position in the shaped object 'M' so as to support the overhang part from a lower side.

In each of the ink-jet heads 4A & 4B, a plurality of nozzles are formed in a line in the sub-scanning direction, and then each nozzle discharges either the model material or the supporting material. As the model material and the supporting material, a light curable material can be used; and a light curable resin liquid and the like that are hardened with light, for example, can be named. In the present embodiment, an explanation is made with respect to an embodiment in which the ink-jet heads 4A & 4B discharge an ultraviolet curable resin liquid, as the light curable resin liquid.

Then, the ink-jet head 4B includes an ink-jet head for a first supporting material and an ink-jet head for a second supporting material that discharge two kinds of supporting materials, i.e., the first supporting material and the second supporting material, respectively, as the supporting material. The first supporting material and the second supporting material individually have an adhesive strength for adhering to the table 7, wherein the adhesive strengths of the first supporting material and the second supporting material are different from each other. When the first supporting material and the second supporting material are compared, the first supporting material has a high adhesive strength for adhering to the table 7, and the second supporting material has a low adhesive strength for adhering to the table 7. As the first supporting material and the second supporting material, a publicly-known conventional supporting material can be used; and it is preferable that the materials are those to be hardened by cross-linkage (polymerization). Therefore, even though the same supporting material is used as the first supporting material and the second supporting material, an adhesive strength for adhering to the table 7 can be adjusted by adjusting a level of cross-linkage (a level of polymerization) of the supporting material. For example, the higher a level of cross-linkage (a level of polymerization) is, the higher an adhesive strength for adhering to the table 7 becomes.

Incidentally, the adhesive strength is a strength in adhesion (adhesive performance) at the time of pulling the first supporting material and the second supporting material out of the table 7, after once applying the first supporting material and the second supporting material onto the table 7 and hardening there. The adhesive strength can be measured, for example, by the cross-cut method. With respect to the first supporting material, preferably an adhesive strength measured by the cross-cut method should be within 0 to 4; and with respect to the second supporting material, preferably an adhesive strength measured by the cross-cut method should be 5.

Although it is described in the explanation above that a publicly-known conventional supporting material can be used as the first supporting material and the second supporting material, the present disclosure is not limited to such a configuration. The model material may be used, for example, as the second supporting material for which lower adhesive strength for adhering to the table 7 than the first supporting material is required.

<Irradiation Units 5A & 5B>

The irradiation units 5A & 5B work to irradiate light for hardening the model material and the supporting material discharged by the ink-jet heads 4A & 4B. As the light, any light can be used as far as the light hardens the model material and the supporting material discharged by the ink-jet heads 4A & 4B. The present embodiment is explained as an embodiment in which the irradiation units 5A & 5B irradiate ultraviolet. As the irradiation units 5A & 5B for ultraviolet irradiation, for example, an LED light source such as an ultraviolet light emitting diode (UVLED), or a metal halide lamp can preferably be used.

The irradiation units 5A & 5B are arranged in the main scanning direction, and are so placed as to have the ink-jet heads 4A & 4B between the irradiation unit 5A and the irradiation unit 5B. Thus, the irradiation units 5A & 5B move in the same direction as a movement direction of the ink jet heads 4A & 4B, namely in the main scanning direction and the sub-scanning direction. In other words, as soon as the ink-jet heads 4A & 4B produce a movement while discharging the model material and the supporting material, the irradiation units 5A & 5B immediately irradiate the model material and the supporting material, which have been discharged, with ultraviolet. Moreover, since the irradiation unit 5A and the irradiation unit 5B are placed at both ends next to the ink-jet heads 4A & 4B, a hardening operation can be carried out for the discharging operation in the reciprocating movement in the main scanning direction.

In this specification, "hardening" includes regular hardening (curing) and temporary hardening (pinning) Namely, "hardening" includes a hardening process for hardening up to a desired hardness in the hardening, and a hardening process for hardening up to a hardness lower than the desired hardness in the temporary hardening.

<Z-Direction Bar 6>

The Z-direction bar 6 stretches in a vertical direction. A direction in which the Z-direction bar 6 stretches can be expressed as a direction perpendicular to the main scanning direction as well as the sub-scanning direction in the three-dimensional printing machine 1, and the direction corresponds to a Z-direction in the drawing. In other words, the direction in which the Z-direction bar 6 stretches is a direction perpendicular to the table 7.

<Table 7>

The table 7 is a workbench on which the shaped object 'M' (and the supporter 'S') is formed, and the table 7 stretches in the horizontal direction, while the Z-direction bar 6 stretches in the vertical direction. The table 7 is mounted onto the Z-direction bar 6, in such a way as to move along the Z-direction bar 6 in the vertical direction. Thus, a position of the table 7 in the vertical direction, namely an elevation of the table 7, is variable.

Incidentally, the table 7 is made of a material to which the first supporting material adheres with a high adhesive strength, and the second supporting material adheres with a low adhesive strength. For example, as the material, there can be named resin materials such as polyethylene (PE), polypropylene (PP), and the like. In the case where a resin plate is installed on the table 7 in such a way as to form the shaped object 'M' (and the supporter 'S') on the resin plate, the resin plate is made of a material to which the first supporting material adheres with a high adhesive strength, and the second supporting material adheres with a low adhesive strength.

<Control Unit 8>

The control unit 8 controls the movement of the Y-direction bar 2, the movement of the carriage 3, the movement of the table 7, and discharging the model material and the supporting materials by use of the ink-jet heads 4A & 4B, in order to form a target shaped object 'M'. Concretely to describe, the control unit 8 creates a plurality of cross-sectional shape data, including layers being sliced at constant intervals in a height direction (namely, in a perpendicular direction) of the shaped object 'M', on the basis of three-dimensional coordinate data of the shaped object 'M', obtained from a three-dimensional CAD (Computer Aided Design) and the like. At the time of creating the cross-sectional data described above, the control unit 8 also creates cross-sectional data of the supporter 'S' for supporting the shaped object 'M' at the time of shaping.

The control unit 8 forms a layer corresponding to each of the cross-sectional data, by way of discharging the model material and the supporting material while scanning in the main scanning direction (X-direction) as well as the sub-scanning direction (Y-direction) with the ink-jet heads 4A & 4B on the basis of the created cross-sectional data. Though a detailed explanation is made later, the three-dimensional printing machine 1 forms the target shaped object 'M', by way of laminating the hardened-material 'm' on the table 7, wherein the hardened-material 'm' being obtained by hardening a layer that is formed of the model material and the supporting material.

(Three-Dimensional Printing Method)

Subsequently, an explanation is made with respect to a three-dimensional printing method for forming the shaped object 'M' by use of the three-dimensional printing machine 1 according to the present embodiment.

At first, the control unit 8 creates the cross-sectional shape data including 'n' layers (wherein, 'n' is an integer equal to, or greater than two) being sliced at constant intervals in a height direction (namely, in a perpendicular direction) of the shaped object 'M', on the basis of three-dimensional coordinate data of the shaped object 'M', obtained from a three-dimensional CAD (Computer Aided Design) and the like; and cross-sectional data of the supporter 'S' for supporting the shaped object 'M' at the time of shaping.

Subsequently, the control unit 8 lifts the table 7 up and down along the Z-direction bar 6 in such a way that a top surface of the table 7 is located at a landing position of the model material and the supporting material discharged from the ink jet heads 4A & 4B. Then, the control unit 8 forms a lowermost layer, on the basis of a cross-sectional shape datum for the lowermost layer, by way of control for discharging the model material and the supporting material from the ink-jet heads 4A & 4B while scanning in the main scanning direction (X-direction) as well as the sub-scanning direction (Y-direction) with the ink-jet heads 4A & 4B. At the time, while the model material and the supporting material being discharged from the ink-jet heads 4A & 4B, ultraviolet light is irradiated by the irradiation units 5A & 5B installed in the carriage 3. Thus, at the time when the ink-jet heads 4A & 4B finish forming the layer with the model material and the supporting material, the hardened-material 'm' as a result of hardening the layer is formed on the table 7.

Incidentally, the three-dimensional printing machine 1 may be equipped with a roller for removing an excessive model material and an excessive supporting material, as needed, in order to flatten a top surface of the layer formed on the table 7. For example, the roller may be installed in the carriage 3; and while the model material and the supporting material being discharged from each of the ink-jet heads 4A & 4B at the time of outward movement of the carriage 3, the roller may rotate in contact with the top surface of the layer formed on the table 7 at the time of return movement of the carriage 3, in order to flatten the surface of the layer.

After the hardened-material 'm' for the lowermost layer is formed, the control unit 8 lifts the table 7 up and down along the Z-direction bar 6 in such a way that the top surface of the hardened-material 'm', formed on the table 7, is located at a landing position of the model material and the supporting material discharged from the ink-jet heads 4A & 4B. Then, a next hardened-material 'm' is formed on the top surface of the hardened-material 'm' as the lowermost layer, according to the same procedures as those for forming the hardened-material 'm' of the lowermost layer. Thus, the shaped object 'M' and the supporter 'S', made up by laminating 'n' sets of the hardened-material 'm', are formed by repeating the process described above 'n' times.

In a view shown in FIG. 1, a section represented with 'M' is where each layer is laminated with the model material, and meanwhile a section represented with 'S' is where each layer is laminated with the supporting material. In FIG. 1, the model material shown as the section represented with 'M' has a form that becomes wider, upward from a lower side in the Z-direction; and therefore, the supporting material is provided at the section represented with 'S' for supporting an overhang part of the model material at right-hand and left-hand sides. At the time when a shaping operation finishes in the procedures described above, the shaped object 'M' is formed collectively together with the supporter 'S'. Then, the shaped object 'M' composed of only the model material can be obtained by removing the supporter 'S'.

(Shaping the Supporter 'S')

Figure 3:
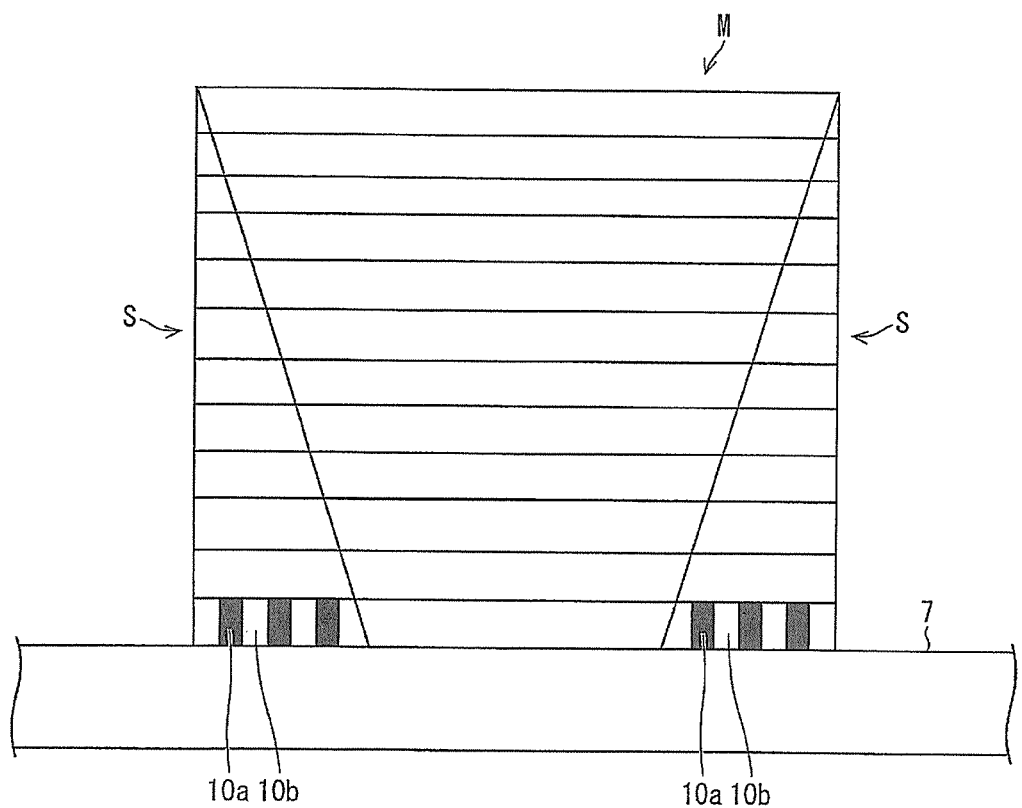
FIG. 3 is a diagram showing a cross-sectional view of a shaped object in the middle of a forming process.

FIG. 3 shows a cross-sectional view of the shaped object in the middle of a forming process. At the time of forming the lowermost layer of the supporter 'S' (that is to say; a layer that contacts the table 7), the three-dimensional printing machine 1 according to the present embodiment forms the lowermost layer with the first supporting material and the second supporting material. Concretely to describe, as shown in FIG. 3, the lowermost layer of the supporter 'S' is formed of a part 10a made of the first supporting material, and a part 10b made of the second supporting material. In other words, the ink-jet head 4B discharges the first supporting material and the second supporting material, according to a discharge pattern in which an area for discharging the first supporting material and another area for discharging the second supporting material independently exist, in order to form the lowermost layer of the supporter 'S'. Thus, in the lowermost layer of the supporter 'S', there exist a part where the first supporting material adheres to the table 7, and another part where the second supporting material adheres to the table 7.

Incidentally, the first supporting material adheres to the table 7 with a high adhesive strength, and meanwhile the second supporting material adheres to the table 7 with a low adhesive strength. Therefore, at the time of dismounting the shaped object 'M' and the supporter 'S' (hereinafter, collectively called a cubic body) out of the table 7 after the shaping operation finishes, a stress is likely to concentrate around a border between the first supporting material and the second supporting material. As a result, when an external force is applied, the stress tends to be transmitted so that the cubic body is likely to be dismounted easily out of the table 7. Thus, by forming the lowermost layer of the supporter 'S' with the part 10a made of the first supporting material, and the part 10b made of the second supporting material, the stress at the time of dismounting the cubic body out of the table 7 is transmitted easily so that the cubic body can easily be dismounted out of the table 7.

Accordingly, time required for dismounting the cubic body out of the table 7 can be shortened. Moreover, in the case where the cubic body is formed on a resin plate, the resin plate does not get deformed and it is not needed to cut the resin plate around the cubic body, at the time of dismounting the cubic body out of the resin plate. Therefore, it is not needed to change the resin plate every time when the shaped object 'M' is formed, so that the resin plate can be reused.

Although mentioned above is an embodiment in which the lowermost layer of the supporter 'S' is formed of the part 10a made of the first supporting material and the part 10b made of the second supporting material, the present disclosure is not limited to such an arrangement. For example, all layers of the supporter 'S' or a plurality of layers including the lowermost layer may be formed of the part 10a made of the first supporting material and the part 10b made of the second supporting material. When the supporter 'S' is built by way of laminating layers formed of the part 10a made of the first supporting material and the part 10b made of the second supporting material, a strength of the supporter 'S' can be enhanced. As a result, it becomes possible to prevent the shaped object 'M' from breakage. Moreover, in the case where the first supporting material is deliquescent, the second supporting material also works as a dam for blocking deliquescence.

(Discharge Pattern of the Supporting Materials)

Figure 4A:
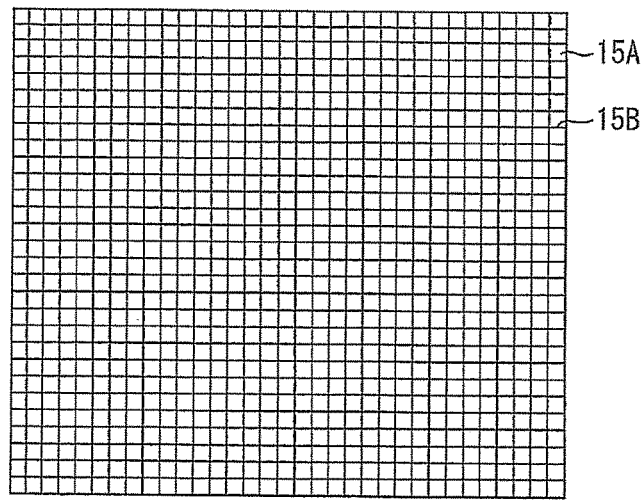
FIG. 4A through FIG. 4C show examples of a discharge pattern of a first supporting material and a second supporting material.
Figure 4B:
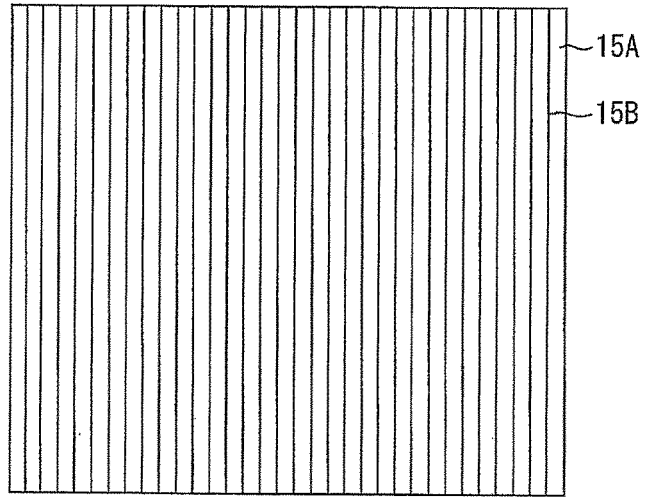
Figure 4C:
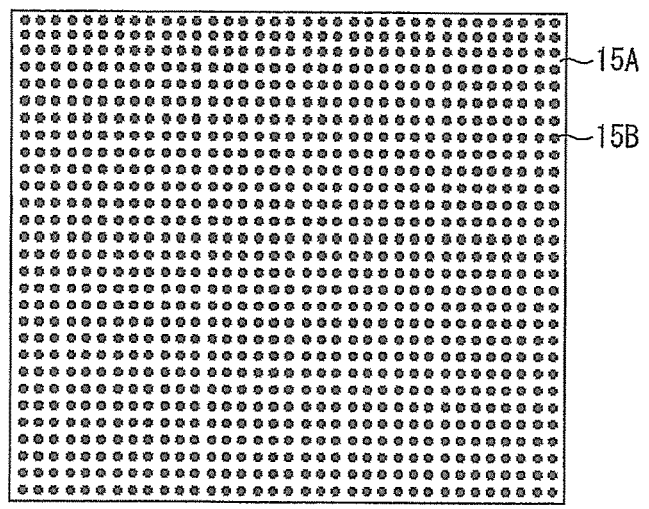

Shown in FIGS. 4A-4C are examples of a form pattern of the part 10a made of the first supporting material and the part 10b made of the second supporting material; namely, a discharge pattern of the first supporting material and the second supporting material.

As shown in FIG. 4A, applied may be a discharge pattern in which a second supporting material 15B is so discharged as to be a grid pattern, and a first supporting material 15A is discharged into each space block in the grid pattern of the second supporting material 15B. Moreover, as shown in FIG. 4B, applied may be a discharge pattern in which the second supporting material 15B is so discharged as to be a stripe pattern, and the first supporting material 15A is discharged into each space between neighboring two striped lines of the second supporting material 15B. Otherwise, as shown in FIG. 4C, applied may be a discharge pattern in which the second supporting material 15B is so discharged as to be spots, and the first supporting material 15A is discharged in a space among the spots of the second supporting material 15B. Incidentally, as far as there exists a border part between the first supporting material 15A and the second supporting material 15B, the stress at the time of dismounting the cubic body out of the table 7 is transmitted at the border part so that the cubic body can easily be dismounted, and therefore no specific restriction exists with respect to a width of the grid pattern, a space between the stripe lines, and an interval among the dots.

Although there exists no specific restriction on the discharge pattern of the first supporting material 15A and the second supporting material 15B, it is preferable to discharge the second supporting material 15B so as to be lines (for example, in a stripe pattern or a grid pattern). If the second supporting material 15B is formed as lines, the stress at the time of dismounting the shaped object 'M' out of the table 7 is transmitted further easily, so that the shaped object 'M' can be dismounted further easily out of the table 7.

Incidentally, in the case where the second supporting material 15B is formed as lines, an adhesive strength of the supporting material as a whole, for adhering to the table 7, can be adjusted by way of adjusting a thickness, a density, and the like of the lines. For example, by way of adjusting a thickness, a density, and the like of lines of the second supporting material 15B, in accordance with an adhesive strength of the first supporting material 15A for adhering to the table 7, an adhesive strength of the supporting material as a whole, for adhering to the table 7, can be set with a desired strength.

Incidentally, with respect to a fact that the first supporting material and the second supporting material individually have an adhesive strength for adhering to the table 7, wherein the adhesive strengths of the first supporting material and the second supporting material are different from each other; the fact can alternatively be described that the first supporting material and the second supporting material individually have a hardness after being hardened, wherein the hardness of the first supporting material and the hardness of the second supporting material are different from each other. In other words, the three-dimensional printing method according to the present disclosure can alternatively be described as stated below; included are a step of discharging the model material onto the table 7 in order to form each layer of the shaped object 'M', and a step of discharging the supporting material onto the table 7 in order to form each layer of the supporter 'S' for supporting the shaped object 'M', wherein, in the step of forming each layer of the supporter 'S', the first supporting material and the second supporting material are discharged as the supporting material, in order to form at least the lowermost layer of the supporter 'S' with the first supporting material and the second supporting material, while at least one of the hardness, the stiffness, and the coefficient of elasticity of the first supporting material and the second supporting material, after being applied onto the mount table and hardened there, is different between the first supporting material and the second supporting material, and Particularly, in the step of forming each layer of the supporter 'S', it is preferable that at least the lowermost layer of the supporter 'S' is formed by way of making a layer of a grid pattern with the second supporting material, and filling each space block in the grid pattern of the second supporting material with the first supporting material; while at least one of the hardness, the stiffness, and the coefficient of elasticity of the second supporting material after being hardened is higher than a corresponding property of the first supporting material.

SUMMARY

The three-dimensional printing machine 1 according to one aspect of the present disclosure includes: a mount table (the table 7) on which the shaped object 'M' and the supporter 'S' for supporting the shaped object 'M' are installed; an ink-jet head (the ink-jet head 4A) for the model material, in order to discharge the model material onto the mount table for forming each layer of the shaped object 'M'; and an ink-jet head (the ink-jet head 4B) for the first supporting material and an ink-jet head (the ink-jet head 4B) for the second supporting material, in order to individually discharge the first supporting material and the second supporting material onto the mount table for forming each layer of the supporter 'S'; adhesive strengths of the first supporting material and the second supporting material, for adhering to the mount table, being different from each other.

At least the lowermost layer of the supporter 'S' is formed of the first supporting material and the second supporting material by use of the three-dimensional printing machine 1 according to the present disclosure; and therefore, the lowermost layer of the supporter 'S' is formed of the first supporting material and the second supporting material. According to the configuration described above, at the time of dismounting the shaped object 'M' and the supporter 'S' (hereinafter, collectively called a cubic body) out of the mount table after the shaping operation finishes, a stress is likely to concentrate around a border between the first supporting material and the second supporting material. As a result, when an external force is applied, the stress tends to be transmitted so that the cubic body is likely to be dismounted easily out of the mount table.

Moreover, the three-dimensional printing method according to one aspect of the present disclosure includes: a step of discharging the model material onto the mount table in order to form each layer of the shaped object 'M'; and a step of discharging the supporting material onto the mount table in order to form each layer of the supporter 'S' for supporting the shaped object 'M', wherein, in the step of forming each layer of the supporter 'S', the first supporting material and the second supporting material are discharged as the supporting material in order to form at least the lowermost layer of the supporter 'S' with the first supporting material and the second supporting material, the adhesive strengths of the first supporting material and the second supporting material, for adhering to the mount table, being different from each other.

According to the method described above, the lowermost layer of the supporter 'S' is formed of the first supporting material and the second supporting material. Therefore, at the time of dismounting the cubic body out of the mount table after the shaping operation finishes, a stress is likely to concentrate around a border between the first supporting material and the second supporting material. As a result, when an external force is applied, the stress tends to be transmitted so that the cubic body is likely to be dismounted easily out of the mount table.

Moreover, in the three-dimensional printing method according to one aspect of the present disclosure, the ink-jet heads for the supporting materials discharge the first supporting material and the second supporting material, according to a discharge pattern in which an area for discharging the first supporting material and another area for discharging the second supporting material independently exist, in order to form at least the lowermost layer of the supporter.

According to the method described above, the lowermost layer of the supporter 'S' is formed so as to include a section made of the first supporting material and a section made of the second supporting material. Therefore, the stress at the time of dismounting the cubic body out of the mount table is transmitted easily so that the cubic body can easily be dismounted out of the mount table.

Moreover, in the three-dimensional printing method according to one aspect of the present disclosure, the ink-jet heads for the supporting materials discharge the first supporting material and the second supporting material, according to the discharge pattern described above, in order to form all layers of the supporter 'S' or a plurality of layers including the lowermost layer.

According to the method described above, a strength of the supporter 'S' can be enhanced. As a result, it becomes possible to prevent the shaped object 'M' from breakage. Moreover, in the case where the first supporting material is deliquescent, the second supporting material also works as a dam for blocking deliquescence.

Moreover, in the three-dimensional printing method according to one aspect of the present disclosure, an adhesive strength of the second supporting material for adhering to the mount table is lower than an adhesive strength of the first supporting material for adhering to the mount table; and the discharge pattern described above is a discharge pattern in which the second supporting material is so discharged as to be a grid pattern, and the first supporting material is discharged into each space block in the grid pattern of the second supporting material.

According to the method described above, the stress at the time of dismounting the shaped object 'M' out of the mount table is transmitted further easily, so that the shaped object 'M' can be dismounted further easily out of the mount table.

Moreover, the three-dimensional printing method according to one aspect of the present disclosure includes: a step of discharging the model material onto the mount table in order to form each layer of the shaped object 'M'; and a step of discharging the supporting material onto the mount table in order to form each layer of the supporter 'S' for supporting the shaped object 'M', wherein, in the step of forming each layer of the supporter 'S', the first supporting material and the second supporting material are discharged as the supporting material, while at least one of the hardness, the stiffness, and the coefficient of elasticity of the first supporting material and the second supporting material, after being applied onto the mount table and hardened there, is different between the first supporting material and the second supporting material, and at least the lowermost layer of the supporter 'S' is formed by way of making a layer of a grid pattern with the second supporting material, and filling each space block in the grid pattern of the second supporting material with the first supporting material; while at least one of the hardness, the stiffness, and the coefficient of elasticity of the second supporting material after being hardened is higher than a corresponding property of the first supporting material.

According to the method described above, the stress at the time of dismounting the shaped object 'M' out of the mount table is transmitted further easily, so that the shaped object 'M' can be dismounted further easily out of the mount table.

The present disclosure is not limited to each of the embodiments described above, and various alterations can be made within scopes described in the claims, and an embodiment to be obtained as a result of arbitrarily combining technical means disclosed individually in the various embodiments is also included in a technical scope of the present disclosure.

INDUSTRIAL APPLICABILITY

The present disclosure is suitable for a three-dimensional printing machine that forms a shaped object having a three-dimensional form.

What is claimed is:

1. A three-dimensional printing method for forming a cubic body having a shaped object and a supporter which supports the shaped object, by laminating a hardened-material of a model material and a supporting material that are hardened, and the three-dimensional printing method comprising:
   a step of discharging the model material onto a mount table in order to form each layer of the shaped object at a lowermost layer and contacting with the mount table; and
   a step of discharging the supporting material onto the mount table in order to form each layer of the supporter;
   wherein, in the step of forming each layer of the supporter, a first supporting material and a second supporting material are discharged as the supporting material surrounding the model material at the lower most layer,
   adhesive strength of the first supporting material being greater than adhesive strength of the second supporting material, for adhering to the mount table, wherein the first and second supporting materials are alternately formed at the lowermost layer, and each first support material is surrounded by the second supporting materials in a cross-sectional view.

2. The three-dimensional printing method according to claim 1, wherein
   the first supporting material and the second supporting material are discharged, according to a discharge pattern in which an area for discharging the first supporting material and another area for discharging the second supporting material independently exist, in order to form at least the lowermost layer of the supporter.

3. The three-dimensional printing method according to claim 2, wherein
   all layers of the supporter or a plurality of layers including the lowermost layer are formed by way of discharging the first supporting material and the second supporting material, according to the discharge pattern.

4. The three-dimensional printing method according to claim 2, wherein
   an adhesive strength of the second supporting material for adhering to the mount table is lower than an adhesive strength of the first supporting material for adhering to the mount table; and
   the discharge pattern is a discharge pattern in which the second supporting material is so discharged as to be a grid pattern, and the first supporting material is discharged into each space block in the grid pattern of the second supporting material.

5. The three-dimensional printing method according to claim 3, wherein
   an adhesive strength of the second supporting material for adhering to the mount table is lower than an adhesive strength of the first supporting material for adhering to the mount table; and
   the discharge pattern is a discharge pattern in which the second supporting material is so discharged as to be a grid pattern, and the first supporting material is discharged into each space block in the grid pattern of the second supporting material.

6. The three-dimensional printing method according to claim 1, wherein
   both the model material and the supporting material are formed by discharging ink by an ink-jet method.

7. The three-dimensional printing method according to claim 1, wherein both the first supporting material and the second supporting material are light curable resin that is hardened by cross-linkage when being irradiated with a light, and the first supporting material and the second supporting material are different in material or a level of cross-linkage so as to have different adhesive strengths.

8. The three-dimensional printing method according to claim 1, wherein the second supporting material is discharged to the lowermost layer.

9. A three-dimensional printing method for forming a cubic body having a shaped object and a supporter which supports the shaped object, by laminating a hardened-material of a model material and a supporting material that are hardened, and the three-dimensional printing method comprising:
   a step of discharging the model material onto a mount table in order to form each layer of the shaped object; and
   a step of discharging the supporting material onto the mount table in order to form each layer of the supporter;
   wherein, in the step of forming each layer of the supporter, the first supporting material and the second supporting material are discharged as the supporting material, while at least one of the hardness, the stiffness, and the coefficient of elasticity of the first supporting material and the second supporting material, after being applied onto the mount table and hardened there, is different between the first supporting material and the second supporting material; and
   at least a lowermost layer of the supporter which is in physical contact with the mount table, is formed by way of making a layer of a grid pattern with the second supporting material, and filling each space block in the grid pattern of the second supporting material with the first supporting material, wherein each first support material is surrounded by the second supporting materials in a cross-sectional view, and at least one of the hardness, the stiffness, and the coefficient of elasticity of the second supporting material after being hardened is higher than a corresponding property of the first supporting material,
   wherein both the first supporting material and the second supporting material are light curable resin that is hardened by cross-linkage when being irradiated with a light.

10. The three-dimensional printing method according to claim 9, wherein
    both the model material and the supporting material are formed by discharging ink by an ink-jet method.

* * * * *